United States Patent [19]
Morton

[11] 3,865,493
[45] Feb. 11, 1975

[54] APPARATUS FOR DIRECT ELECTRONIC MEASUREMENT OF IMAGES

[75] Inventor: Roger Roy Adams Morton, Penfield, N.Y.

[73] Assignee: Bausch & Lamb Incorporated, Rochester, N.Y.

[22] Filed: Aug. 14, 1973

[21] Appl. No.: 388,315

Related U.S. Application Data

[62] Division of Ser. No. 224,710, Feb. 9, 1972, abandoned, which is a continuation of Ser. No. 878,679, Nov. 21, 1969, abandoned.

[52] U.S. Cl. .......................... 356/158, 178/DIG. 36
[51] Int. Cl. .................................. G01b 11/28
[58] Field of Search .......... 356/158, 157; 313/65 A; 250/560; 178/DIG. 36, 7.6

[56] References Cited
UNITED STATES PATENTS
3,268,764    8/1966    Simms.............................. 313/65 A Primary Examiner—Ronald L. Wibert
Assistant Examiner—Paul K, Godwin
Attorney, Agent, or Firm—Frank C. Parker; Bernard D. Bogdon

[57] ABSTRACT

An electron scanning tube, similar to the vidicon television camera tube, having a three layered target comprising a transparent conducting layer, a transparent insulating layer and a photoconductive layer, is employed in conjunction with suitable electronic circuitry to measure the area and all parameters determinable therefrom of all images within the tube's field of view.

5 Claims, 7 Drawing Figures

ROGER R. A. MORTON
INVENTOR.

BY

SAUL A. SEINBERG
ATTORNEY

ROGER R. A. MORTON
INVENTOR.

BY

SAUL A. SEINBERG
ATTORNEY

APPARATUS FOR DIRECT ELECTRONIC MEASUREMENT OF IMAGES

This is a division of application Ser. No. 224,710 filed Feb. 9, 1972, now abandoned, which is a continuation of Ser. No. 878,679, Nov. 21, 1969, now abandoned.

BACKGROUND OF THE INVENTION

1. Field of the Invention

This invention relates to the field of imagery measurement and, more particularly, to apparatus for direct electronic measurement of area and all related parameters thereof.

2. Description of the Prior Art

Detection and analysis of particulate materials is a necessity spanning a broad spectrum of scientific, engineering and industrial disciplines. Of particular importance in analyzing a particle population or sample is the size of area distribution thereof. There are two basic approaches to the analysis of any particle or image population: indirect measurements of secondary effects manifested by the particles or direct measurement via an optical or electron microscope.

The indirect techniques employed permit relatively quick measurement of the sample particle or image population under study. This approach is typified by methods such as sedimentation of particles. In using this method, a suspension is allowed to settle by gravity or centrifugation whereupon the optical clarity of the mixture is measured as a function of time and/or position. By assuming a number of factors, such as particle density, hydraulic flow resistance, multi-particle interactions and agglomeration characteristics, certain information concerning the particles or images can be inferred.

Light scattering is another analog technique employed for measuring both discrete particles and aggregates. This technique assumes a known, invarient relationship between the diameter of a particle and the proportion of incident light scattered by that particle. Individual acintillations caused by a particle entering the scattering zone of the measuring apparatus are then detected. The detected information can be gated into various categories to yield instantaneous results or, alternatively, transformed into a permanent record. In employing the light scattering technique, certain factors such as the effects produced by particle shape, color, coincidence and refractive index must be ignored.

Because the various indirect techniques do not make direct measurement of the particles under study, and because certain particle factors are either ansused or ignored, or both, the results obtained are often open to question. Thus, only the grossest assessment of actual particle characteristics or parameters are attempted or derived with these indirect methods.

Microscopic measurement of a particle sample, on the other hand, permits the direct measurement determination of particle parameters to any degree of precision desired. Further, one can measure any number of different particle parameters using this technique. An extremely wide size range of particle can be accommodated through microscopic examination and, most importantly, this technique furnishes the investigator with a direct and unambiguous measure of the particle population under study. This ability to obtain precise, detailed information is a paramount advantage in particle analysis. However, manual microscopic methods do have significant disadvantages. Measurement with the microscope is a slow process and was, until the present time, considered particularly unsuitable for use in conjunction with automated processes. A comparatively long measurement interval is required to achieve statistically valid results. Furthermore, a relatively high degree of operator skill and technical knowledge are necessary for accurate results. In addition, operator fatique is a limiting factor in repetitive sampling. Finally, the data obtained by using the microscope must be mathematically transformed into some meaningful set of measurements. All of these disadvantages combine to limit the number of samples which can be processed by this manual technique. These problems have been eased somewhat by improvements designed to facilitate particle measurement. Particle measuring systems have come into use wherein a television camera is employed to pick up the microscopic image for eventual projection on a monitor where particle measurements are made on the particle image directly or indirectly by associated electronic equipment. Generally, these prior art systems use a television camera or scanning device which is played over a discrete region containing the particles of interest. Interception of a particle in the path of the scanning device produces an electrical signal which is operated on by the remainder of the system to yield the desired particle parameter.

Unfortunately, these particle measuring systems were either primarily intended for laboratory use or were too expensive for their intended purpose. Recently, a unique system for rapidly and accurately determining the parameters of a particle population which solved most of the above-enumerated problems was introduced, See U.S. Pat. Application Ser. No. 835,673, abandoned and filed as continuation application Ser. No. 210,278, now issued as U.S. Pat. No. 3,805,028, filed in the name of the same inventor and assigned, as well, to the assignee of the instant invention. However, even this recent development did not negative the need for relatively inexpensive apparatus with which certain particle parameters, particularly area, could be directly measured, accurately and rapidly, free of the limitations noted in connection with prior art methods and apparatus.

SUMMARY OF THE INVENTION

Accordingly, a primary object of the present invention is to provide relatively inexpensive apparatus for directly measuring images.

Another object of the present invention is to provide an improved type of electronics scanning tube which plays a greater role in the measurement process itself thereby eliminating some electronic circuitry.

Still another object of the present invention is to provide apparatus which efficiently utilizes such a scanning tube in determining area or size distribution of an image population.

A further object of the present invention is to provide an improved electronic scanning tube for use in measuring image areas having a three layered target comprising a transparent conducting layer, a transparent insulating layer and a photoconductive layer therein.

Yet another object of the present invention is to provide relatively inexpensive image area measuring apparatus which is particularly suitable for automated operation.

Therefore, a unique electronic scanning tube having a three layered target therein is employed in conjunction with suitable electronic circuitry for determining the area or size distribution of a particle population. The negative image or images of the sample, that is, the image formed by transparent particles on a dark background, is projected onto the target. In the regions where the photoconductive layer of the target is illuminated, its resistivity drops four or five orders of magnitude below its "dark" value. As a result, whenever an electron beam within the scanning tube impinges on the image of a particle, the whole area of the particle becomes discharged. If the conducting areas are discharged to the same voltage, the time integral of the discharge current for each particle image will be proportional to its area. Further, by insuring that each image is discharged only once and remains discharged, a train of pulses is generated having the same amplitude distribution as the area distribution of the sample. Appropriate electronic circuitry responsive to the generated pulse train is also employed to yield direct readout of the measurements or to store the results until needed.

BRIEF DESCRIPTION OF THE DRAWINGS

FIG. 1 is a cross-sectional diagram of the electronic scanning tube according to the present invention together with its associated circuitry.

FIG. 2 is a partial expanded cross-sectional view of the target of the tube illustrated in FIG. 1.

FIG. 3 is a block diagram of the circuitry comprising the sequencing unit of FIG. 1.

FIG. 5 is an illustration of a particle image the shape of which is assumed for the purpose of theoretical discussions concerning operation of the electronic scanning tube, the image having scan lines superimposed thereover.

FIG. 6 is an illustration

DESCRIPTION OF THE PREFERRED EMBODIMENT

Figures 1, 2, 3, 5, 6:
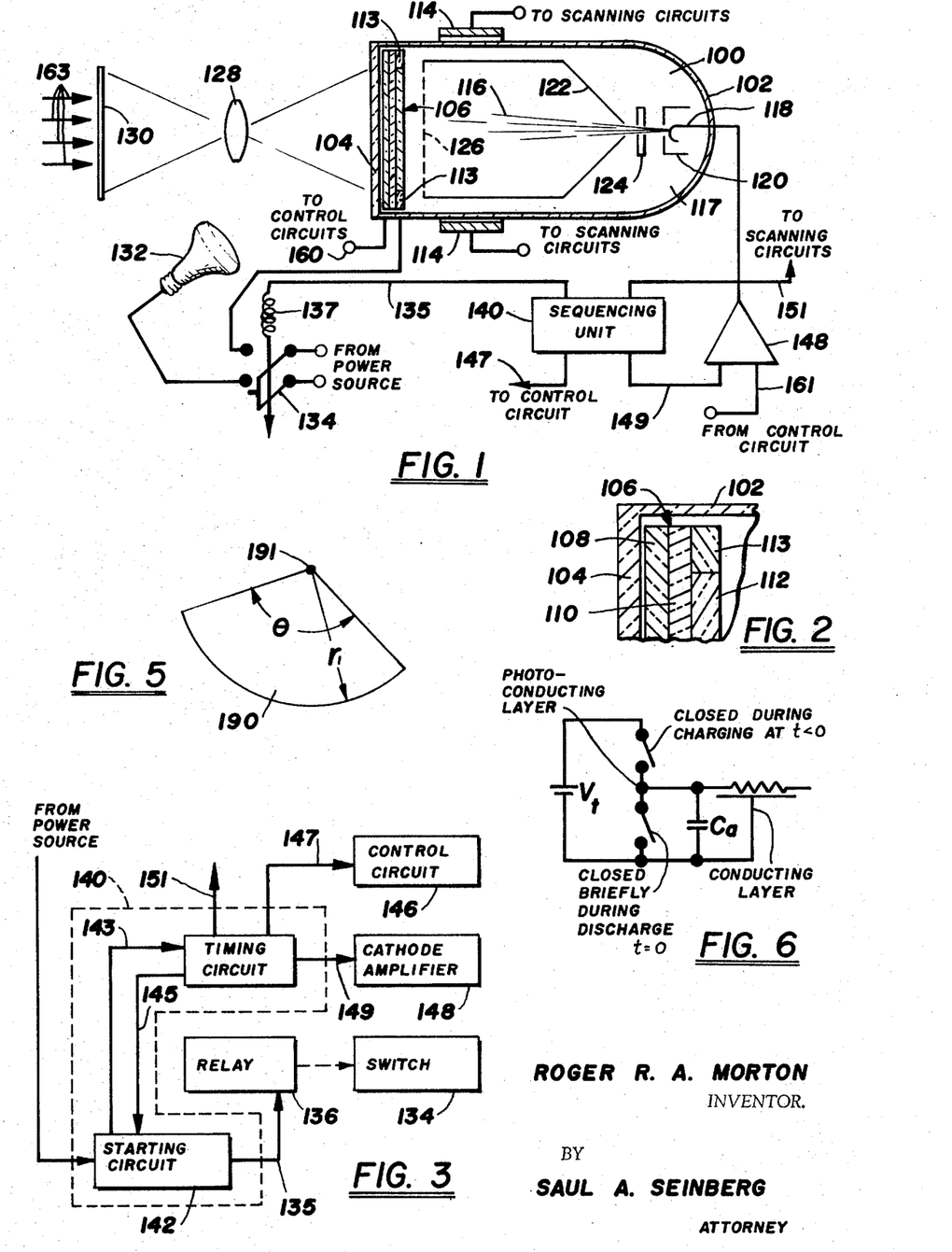

Referring now to the drawings wherein like reference numerals have been employed where appropriate in the several views for like elements, FIG. 1 illustrates a cross-sectional view of the scanning tube and its associated circuitry according to the present invention. The tube, generally indicated by reference numeral 100, is enclosed by a glass envelope 102, the face 104 of which is substantially parallel to the target 106. As best seen in FIG. 2, target 106 comprises a transparent conducting layer 108 connected to line 160, a transparent insulating layer 110 and a photoconductive layer 112. Typically, the transparent conductive layer 108 is formed from aluminum or gold, however, any other equivalent material will yield satisfactory results. The transparent insulating layer 110 is generally formed from any suitable material, for example, aluminum oxide. However, other materials exhibiting the requisite characteristics can be utilized with satisfactory results. The photoconductive layer 112, having a conducting ring 113 fastened therearound, is generally formed, for example, from cadmium sulfide ($C_{d2}S_3$) or tin sulfide ($S_{b2}S_3$). Other photoconductive materials exhibiting the requisite characteristics can be utilized with satisfactory results. The actual choice, however, is usually dictated by the type of available or incident light and other criteria. A discussion of the general operation of a standard vidicon tube and of its constituent parts can be found in most standard textbooks on the subject, such as, Basic Television, by Bernard Grob, Third Edition, 1964, published by McGraw-Hill, Inc. Reference to such a discussion will greatly enhance an understanding of the present invention.

Deflection coils 114, which surround the tube 100, as shown in FIG. 1, are employed to deflect the electron beam 116 generated by the electron gun 117 for scanning purposes. The deflection coils 114 are controlled by a scanning circuit (not shown) of a type well known in the art. The beam 116 is generated by an electron gun 117. wherein electrons are liberated by thermionic emission from the cathode 118 which is, at least, partially surrounded by a grid 120. Adjacent to cathode 118 is grid 120, which serves to fix the electron beam current. A grid 122 also serves to focus the beam 116 via electrostatic action. Still another grid 124 is employed to accelerate the electrons comprising the beam 116 towards the target 106. Grid 126, a mesh screen disposed generally near and parallel to the target 106 having an open area of 50–70percent, is charged to a potential which accelerates the electrons as they approach the target 106. Having passed through grid 126, the electrons are decelerated as they approach target 106. Consequently, secondary emission is insignificant Lens 128 is positioned between the transparent sample tube image or pattern 130 and the face 104 of tube 100 so that a focused image of the sample 130 is presented on the target 106. A floodlight 132, which is employed to initially uniformly illuminate the target 106 with light prior to operation of the tube 100 is positioned generally between the transparent sample 130 and the tube face 104. It is not necessary, for successful operation of the tube 100, that the floodlight 132 be used, although its use does provide a convenient manner of setting the target 106 to a uniform potential equal to the potential of the conducting ring 113.

Conducting ring 113 and floodlight 132 are directly connected to one side of a relay operated switch 134. Operation of the relay 136, as best seen in FIG. 3, causes switch 134 to close thereby connecting conducting ring 113 and floodlight 132 to appropriate sources of power (not shown). Conducting ring 113 is connected, by the energization of relay 136, to source $V_t$, about +40 volts D.C. in the preferred embodiment, as seen in FIG. 6. Floodlight 132 is connected, by the energization of relay 136, to an appropriate source of power which permits it to function as intended.

Sequencing unit 140, a block diagram of which is separately illustrated within the dashed portions of FIG. 3, determines the sequence of operation of scanning tube 100 and its associated circuitry. Operation is initiated by actuating starting circuit 142 which causes the energization of relay 136 and the closing of switch 134. This cause, in turn, the connection of conducting ring 113 and floodlight 132 to their respective sources of power. Starting circuit 142 can be a simple mechanical switch, a more sophisticated electromechanical device or even a solid state circuit. In addition, although they are separately illustrated, the functions of starting circuit 142 and relay 136 can be combined within a single device or circuit. The choice, which turns on such design factors as cost, reliability, efficiency, availability, etc., is left to the designer.

Energization of starting circuit 142 diagrammatically illustrated in FIG. 3, also energizes timing circuit 144. Timing circuit 144, after the passage of a predetermined period of time, generally from an exemplary 0.1 to 0.5 seconds in the preferred embodiment, causes relay 136 to open switch 134. This is accomplished by effectively opening line 135 which de-energizes relay coil 137 thereby allowing switch 134 to return to its normally open position. Timing circuit 144 also produces a signal in response to the expiration of the predetermined period of time in which switch 134 is closed. This signal is passed to the control circuit 146 via line 147, to the cathode amplifier 148 via line 149 and to the scanning circuits (not shown) via line 151. Thus, the control circuit 146, the cathode amplifier 148 and the scanning circuits (not shown) are responsive to and aware of a change in the position of the switch 134. The timing circuit 144 can be chosen from any one of a number of known devices or circuits, as with the case of the starting circuit 142. The choice, as dictated by the circumstances of each particular use, is left to the designer.

When switch 134 is closed and floodlight 132 is turned on, the resistivity of the photoconductive layer 112 drops allowing it to become charged to $V_t$, approximately +40 volts D.C. in the preferred embodiment, through conducting ring 113 which surrounds it. When the floodlight 132 is turned off by the opening of switch 134 in response to this action of timing circuit 144 the image of the sample 130 now illuminates the tube face 104 and scanning is commenced in response to the enabling signal received by the scanning circuits (not shown) via line 151 from the timing circuit 144. An enabling signal from timing circuit 144 sent via line 149 simultaneously sets the output of the cathode amplifier 148 so that scanning can commence. In addition, a signal from timing circuit 144 sent via line 147 informs the control circuit 146 that switch 134 has been opened and that, consequently and impliedly, scanning has commenced.

Scanning is commenced, as noted, after floodlight 132 has been turned off. Thereafter, the target 106 is illuminated by incident light 163 passing through the transparent sample 130. Because the electron beam 116 does not reach the target 106 once the point on target 106 towards which the beam 116 is directed falls below zero volts, the beam 116 is in effect a voltage source of zero potential with respect to the particular target point to which the beam is directed.

Figure 4:
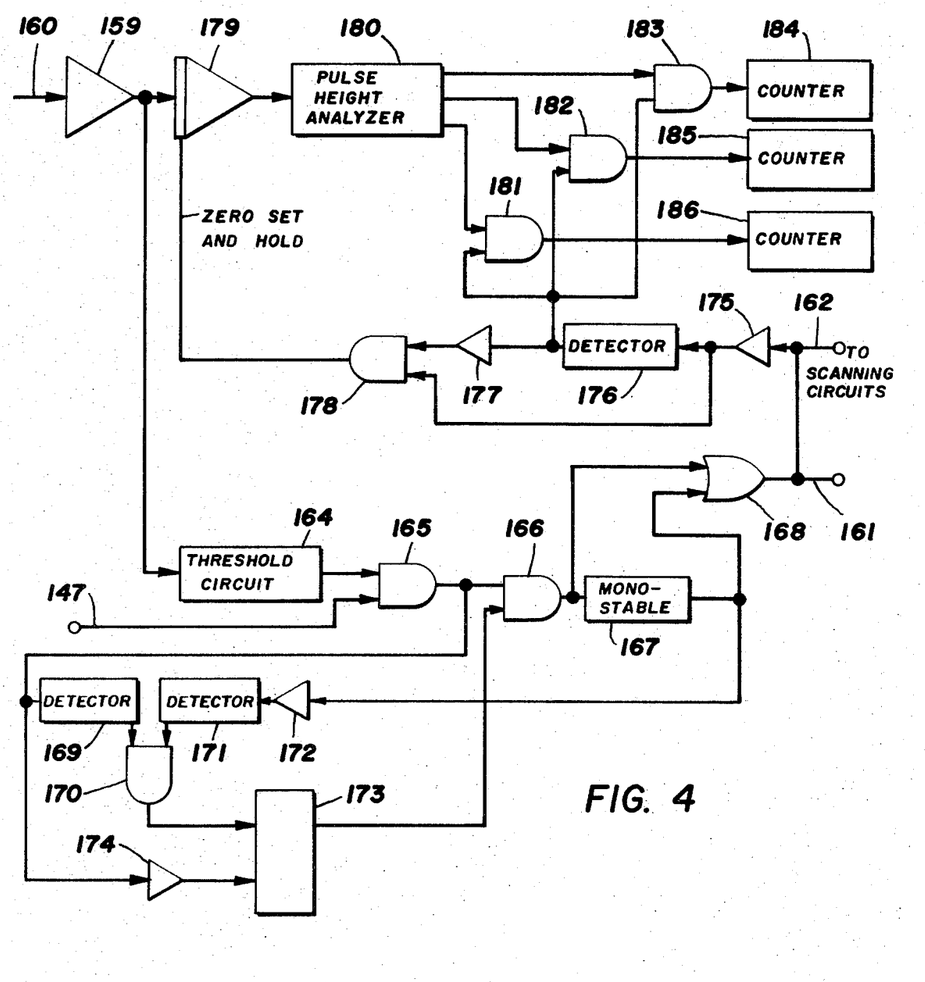
FIG. 4 is a block and logic diagram of the circuitry associated with the area measuring electronic scanning tube illustrated in FIG. 1.

As the beam 116 scans across dark areas on the target or those areas corresponding to opaque areas on the transparent sample 130, a narrow track across target 106 is thereby reduced to a potential of 0 volts. Due to capacitance coupling across insulating layer 110, that is between conductive layer 108 and photoconductive layer 112, a small constant current flows from the conducting layer 108 of target 106 via line 162 through a signal amplifier 159 to threshold circuit 164 of a type well known in the art, as best seen in FIG. 4. For current inputs below a predetermined value, the threshold circuit has a zero output, while for input values in excess of the predetermined value, its output is some finite value. Under these ordinary conditions the relatively low current $i_d$, the "dark" current, is of too low a value to cause the threshold circuit 164 to change from its initial output state. As a result, line 162 to the scanning circuits stays "down" since "AND" gates 165 and 166 and "OR" gate 168 are "down" or have zero output. Once the beam 116 intersects a charged conducting region, the current flow increases considerably to and above the level required to turn on threshold circuit 164. This causes the output state of the threshold circuit 164 to assume its finite value. This causes the monostable 167 to turn on thereby turning on OR gate 168 from the time the output of threshold circuit 164 goes "up" until the end of the delay inherent in monostable 167. The output of OR gate 168 during this interval is termed a pause signal. The pause signal is passed via line 162 to the scanning circuits (not shown). As a consequence thereof, the beam 116 overshoots and returns to the conducting region. The pause signal is simultaneously passed to the cathode amplifier 148 causing the cathode voltage $V_k$ to increase from about zero to approximately twenty volts in the preferred embodiment. The threshold circuit 164, by continuing to sense whether a current greater than its threshold value $i_t$ is flowing at the elevated cathode voltage $V_{k2}$, in fact, determines if the potential of the conducting region struck by the beam 116 is greater than the voltage level to which the cathode 118 has been raised.

This capability enables discharged conducting regions to become recharged up to the elevated cathode voltage $V_{k2}$ by leakage from the surrounding high resistivity region without initiating subsequent discharge cycles. If it is indicated that the conducting region is below the elevated cathode voltage $V_{k2}$, then when monostable 167 resets, scanning recommences, $V_k$ returns to zero and the threshold value $i_t$ of threshold circuit 164 is again exceeded.

The logic comprising leading edge detectors 169 and 171, gate 170 and inverters 172 and 174 driving flip-flop 173, senses that the threshold value $i_t$ was exceeded simultaneously with $V_k$ returning to zero due to the logic arrangement, as illustrated in FIG. 4 and is "set" by that event. This causes, in turn, a negative or "down" output from the flip-flop 173 which turns off AND gate 166, thereby preventing the threshold circuit 164 from testing the relative value of input current with respect to $V_{k2}$. Flip-flop 173 remains set until the signal current falls below its threshold value $i_t$, at which point it is reset on the logical assumption that the scanning spot has moved off the conducting region which initiated the test.

If the test shows the conducting region to be above $V_{k2}$, then it is assumed to be charged to the initial potential $V_t$ and the beam 116 pauses until the discharged current falls below its threshold $i_t$. At this point, the beam 116 reverts to scanning. This event triggers the AND gates 181–183 connected to the pulse height analyzer 180 so that if the output of integrator 179, as determined by the analyzer 180, lies within the range of adjustable thresholds therewithin, a count of 1 is added to counter 184, 185 or 186, whichever represents the corresponding range. In response to this event, the integrator is reset to zero from the output of gate 168 through inverter 175, leading edge detector 176, inverter 177 and gate 178 to ready it for the next test. The number of counters, which are of a type well known in the art, is chosen in accordance with the number of parameter subranges desired to be measured. In addition, the number of counters can be traded against the number of complete frame scans per measurement.

When the beam 116 intercepts a charged conducting region on the target 106, it causes removal of a portion alpha, $\alpha$, of the charge. Typically, it has been found that alpha varies between 0.93 and 0.98 of the charge. In considering this removal operation it is assumed that the electron beam acts as a voltage source over a small circular area of radius $r_s$ on the photoconductive layer 112. The effective source resistance of the beam 116 is neglected since it is much less than the equivalent series resistance presented to an area of radius $r_s$ on the photoconducting layer 112. The magnitude of $2r_s$ is assumed comparable with the diameter of the scanning spot.

Consider an image 190 having a shape such as that shown in FIG. 5; a sector of radius $r_1$, and angle $\theta$. It is assumed that this sector 190 is so oriented that the beam 116 intercepts it for the first time at the junction 191 of the two straight sides. It is further assumed that the ratio of resistivities is large (and this is confirmed in the result) so that the voltage distribution across sector 190 will be the same as that for a distributed tapered RC line with a taper having an incremental resistance $R_1 = 0$ for $0 < r \leq r_s$  (1.1)
$= \rho a/r\theta$ for $r_s \leq r < r_1$  (1.2)
$= \infty$ for $r_1 \leq r$  (1.3)

where $\rho a$ is the resistivity in the plane of the photoconducting layer 112 when illuminated. The incremental capacitance is given by $C = \theta r C_o$ for $r_s \leq r < r_1$  (2.1)
$= 0$ elsewhere where $C_o$ is the capacitance per unit area between the photoconducting layer 112 and the transparent conducting layer 108.

The differential equation for such a distributed line can readily be shown to have a Bessel function solution, however, this result is far too complex to provide simple analysis. Instead, by taking advantage of the fact that $r_s$ is much, much smaller than $r_1$ ($r_s << r_1$), the line can be approximated by an "$n$" section lumped RC filter. Furthermore, calculations using $n = 1$, 2 and 3, yield results which differ by amounts sufficiently small enough to justify the use of a single section filter as the approximated line in this analysis.

The value of the resistance in this RC section is, using equation 1.2.

$$R_a = \int_{r_s}^{r_1} R_1 dr = \frac{\rho_a}{\theta} \ln(r_1/r_s).$$  (3.1)

Similarly, $$C_a = \tfrac{1}{2} C_o \theta (r_1^2 - r_s^2)$$

Thus, when the beam pauses on the conducting region, the signal current $$i \alpha V_t/R_a \exp(-t/C_a R_a).$$  (4.1)

Therefore, the fraction of charge remaining after a pause $t\alpha$ is given by $$\alpha = Q(t_\alpha)/Q(\infty) = 1 - \exp(t_\alpha R_a C_a)$$  (4.2)

where $$Q(t) = \int_0^t i\, dt.$$  (4.3)

Thus, $$t_\alpha = R_a C_a \ln(1 - \alpha).$$  (4.4)

In the time between when the beam 116 leaves the conducting area, traverses one line scan, pauses to discharge other charged regions, and in traversing the next line again intercepts the conducting region, charge in the surrounding area will leak into this discharged region. Clearly this region must not charge up to beyond $V_{k2}$. The potential which the region does reach due to leakage may be found by treating the area around the discharged region as a uniformly, infinitely long RC transmission line and the discharged region as a capacitor. The resulting equivalent circuit is shown in FIG. 6. The resistance per unit length of the transmission line is given by $$R_b = \rho_b/p$$  (6.1)

where $\rho_b$ is the resistivity in the plane of the photoconductive layer 112 when dark and p is the perimeter of the conducting region. The capacitance per unit length is $$C_a = C_o p.$$  (6.2)

Figure 7:
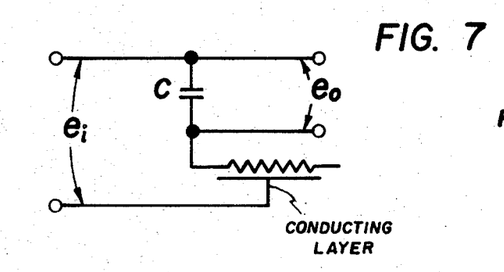
FIG. 7 an equivalent circuit used for discharge analysis. 7 is an illustration of an equivalent circuit modified for use in Laplace transform analysis.

Using the well known result for the input impedance of a long transmission line yields $$Z_i(s) = (R_b/sC_b)$$  (6.3)

where $s$ is the Laplacian operator. FIGS. 6 and 7 are obtained by $$e_o(s) = e_i(s)/(1 + sC_a^2 R_b/C_b)$$  (6.4)

and as the discharge time $t\alpha$ is short compared to the time constants involved in leakage, it can be assumed that $e_i(t)$ changes instantaneously at $t = 0$ from 0 to $V_t$, and, therefore, $$e_i(s) = V_t/s.$$  (6.5)

Taking inverse Laplace transforms yields, $$e_o(t) = V_t(1 - e^u \mathrm{Erfc}(u))$$  (6.6)

where $$u = C_b t/R_b C_a^2$$  (6.7)

and $$Erfc(r) = 2\pi^{-1/2} \int_I^\infty \exp(-t^2) dt. \qquad (6.8)$$

Tentative design criteria wherein each of the parameters developed by means of the above equations have been assigned practical values within the constraints of equations 4.2 and 6.5 are set forth in Table I. It should be noted that the specified parameters are exemplary only and are not intended to limit the invention in any way, since other values could be satisfactorily substituted with no degradation in performance.

TABLE I

| Parameter | Symbol | Value |
| --- | --- | --- |
| voltage to which target is charged | $V_t$ | + 40 volts |
| limit to which a discharged region may recharge due to leakage | $V_{k2}$ | + 20 volts |
| thickness of dielectric layer | $w_d$ | 5 microns |
| thickness of photoconducting layer | $w_p$ | 15 microns |
| target area | — | 3 cm × 3 cm |
| time to start or stop scanning beam | $t_s$ | 5 |
| time to discharge largest conducting region | $t_r$ | 100 sec |
| velocity of scanning beam in X direction | v | $10^4$ cm/sec |
| number of scan lines in Y direction | $N_L$ | 500 |
| radius of apparent area of beam | $r_s$ | $3 \times 10^{-3}$ cm |
| fraction of charge removed by discharging conducting region | $\alpha$ | 0.95 |
| ratio of area of largest to smallest image in the sample | k | 100 |
| area of smallest image | $a_s$ | $3.2 \times 10^{-4}$ cm |

The only parameter which was an initial design goal was $k$, the ratio of the area of the largest to the smallest image in the sample group. The other parameters listed in Table I arose from realizability considerations, from what has been learned in achieving prior art vidicon designs or from practicality constraints. Using the above quantities, specimen calculations have been performed to determine the light and dark resistivities $\rho_a$ and $\rho_b$, the dark current $i_d$, the maximum current $i_m$ and the threshold current $i_t$.

As has been previously noted, the dark resistivity $\rho_b$ is determined by the requirement that $e_o(t_1) < V_{k2}$ where $t_1$ is the time required to perform one line scan. Designing for the worst case requires choosing the smallest conducting region, as it will charge up by leakage current in the shortest time. In addition, the time $t_1$ for a line scan is a statistical quantity and an upper confidence limit for it can be readily determined. Now $t_1$ is the sum of a number of discharged times, plus the time to sweep out the 3 cm of target width, plus stopping and flyback times. The most significant of these component time periods is the time required to discharge conducting regions in the path of the scanning beam 116. From equation 4.2, the discharge time for one conducting region is $$t_\alpha = -R_a C_a \ln(1 - \alpha). \qquad (7.1)$$

Substituting from equation 3.1 and 3.2 yields $$t_\alpha = -\tfrac{1}{2}\rho_a r_1^2 \theta \ln(1-\alpha) \ln(r_1/r_s), \qquad (7.2)$$

which is approximately proportional to the area of the conducting region.

Consider now, for example, a sample of 500 images having a uniform area distribution over the range $a_s$ to $100\,a_s$. Since the images lie at random, the conducting regions to be discharged in any particular line scan will be distributed at Poissen intervals along the line with a spatial rate of $\mu = N/N_L = 1$ per line. The probability of n regions being in the line, not counting the image from which the line scan is assumed to start, is $$\mu^n / n! \, e^{-\mu}, \qquad (8.1)$$

Consequently, the probability that the sum of the discharge times, $t_d$, exceeds $t$, is $$P(t_d > t_1) = \sum_{n=0}^\infty \frac{\mu^n}{n!} e^{-\mu} \int_{t_1}^\infty p_n(t_\alpha) dt_\alpha \qquad (8.2)$$

where $p_n(t\alpha)$ is the n-fold convolution of $p(t\alpha)$, the distribution of discharge times for the sample. For the case being considered, this leads to $$p(t_d < 4\bar{T}_\alpha) = 0.96, \qquad (8.3)$$

thus with the other components of $t_1$, $$p(t_1 < (4\bar{T}_\alpha + v/\lambda + 100\mu S) = 0.96 \qquad (8.4)$$

where $$v/\lambda = 300\mu S, \qquad (8.5)$$

and $\bar{T}_\alpha$, the average discharge time, is approximately $50\mu S$, the $100\mu S$ being for flyback, stops on discharged regions, etc.

Assembling the data yields: From equation 8.4, $$e_o(t_{1max} = 600\mu S) = 20 \text{ Volts} \qquad (9.1)$$

For the smallest lamina, $$C_a = \epsilon a_s / w_d = 5.65 \times 10^{-14} F. \qquad (9.2)$$

The perimeter of the smallest lamina, $$p = (\theta+2)r_1 = 7.2 \times 10^{-2} \text{ cm}. \qquad (9.3)$$

Capacitance $C_b$ (from equation 6.2)

$$C_b = C_o p = \epsilon p/w_d = 1.28 \times 10^{-11} \text{F/cm}.$$

(9.4)

Substituting equations 9.1 to 9.4 into equation 6.5 and interpolating from standard tables gives $$u = 0.785$$

and from equations 6.1, 6.2 and 6.7, $$\rho_b = C_b t_1 p/u C_o^2 = 1.36 \times 10^{11} \text{ ohms},$$

(9.5)

$\rho_a$ is found from equations 1.1 to 1.3, the time to discharge the largest image and the following:

$$C_a = \epsilon k a_s/w_d = 5.65 \times 10^{-12} \text{F},$$

(9.6)

$$R_a = \rho_a/\theta \; ln(r_1/r_s) = 1.75 \; \rho_a.$$

(9.7)

Thus, $$\rho_a = t_\alpha \; /[1.75 C_a k(1-\alpha)] = 3.4 \times 10^6 \text{ ohms}.$$

(9.8)

Consequently, the bulk resistivities are $$\rho_{Ba} = \rho_a w_d = 1.7 \times 10^3 \text{ ohm cm}$$

(9.9)

and $$\rho_{Bb} = 6.8 \times 10^7 \text{ ohm cm},$$

(10.0)

and the ratio of resistivities is $$\rho_b/\rho_a = 4.0 \times 10^4.$$

(10.1)

While many photoconductors exist with a $\rho_b/\rho_a$ ratio of $10^6$ and greater, the difficulty of obtaining the calculated ratio of $4.0 \times 10^4$ will be in realizing sufficient contrast of illumination of the target 106. A precaution necessary because of light passing through the target 106 will be that of insuring that the elements in the tube, the focusing and accelerating grids and the electron gun assembly, do not reflect light back onto illuminated areas of target 106. Coating these elements with non-reflective material is probably the simplest and preferred solution to this problem. In addition, the inner surface of the tube should also be treated to minimize this problem.

The required contrast level at the target 106 depends on the conductivity versus intensity law of the photoconductor. Some photoconductors, such as CdS and CdSc for example, exhibit a conductivity proportional to the square of the intensity of incident illumination, termed superconductivity. If it is possible to employ a suitable square law photoconductor, the required contrast of target 106 is easily achieved.

Because the time constant $R_1 C_o$, where $R_1$ is the resistance to the dielectric layer 110 through the photoconducting layer 112 when it is dark and $C_o$ is the capacitance across the dielectric layer 110, is large compared to the time any point of the photoconducting layer 112 spends under beam 116 during scanning, the dark signal current arises from a purely capacitive effect, that between the scanned surface of the photoconducting layer 112 and the conducting layer 108.

Thus, the capacitance is given by the capacitance across the dielectric layer 110

$$C_o = \epsilon/w_d = 1.78 \times 10^{-10} \text{ F/cm}^2$$

(11.1)

in series with the capacitance across the photoconducting layer 112

$$C_p = \epsilon/w_p = 5.9 \times 10^{-11} \text{F/cm}._2$$

(11.2)

Hence, the signal current when the beam scans across a dark area is $$i_d = 2 r_s v V_t (C_o C_p/(C_o + C_p)) = 1.1 \times 10^{-7} \text{ amp}.$$

(11.3)

When scanning a charged, illuminated region, the time constant $R_1 C_o$ is short compared to the time the beam 116 impinges on any point of the photoconducting layer 112 and the capacitance component of current due to beam motion is $$i_c = 2 r_s v V_t C_o = 4.4 \times 10^{-7} \text{ amp}.$$

(11.4)

The initial resistive components of current when the beam is on a charged region within the photoconducting layer 112 can be approximated by $$i_r = V_t/R_a = 6.8 \times 10^{-6} \text{ amp}.$$

(11.5)

Using the original single section approximation for the discharge analysis of the conducting region reveals that when the charge reaches $l-$ of the original charge, the discharge current has fallen to $$V_t(1 - \alpha)/R_a.$$

(11.6)

Thus, because $R_a$ is relatively independent of the size of the image, the threshold level for the signal current can be set at a fixed value corresponding to $V_t(1-0.95)/R_a$ for large images with the assurance that at this value all sizes of images will be discharged to between 95 and 98 percent of the original charge. Thus, the threshold current $$i_t = V_t (1 - \alpha)/R_a = 3.4 \times 10^{-7} \text{amp}.$$

(11.7)

is well above the dark current. If the dark current $i_d$ is not sufficiently below the threshold value, then $C_p$ may be reduced by increasing the thickness of photoconductive layer 112. However, there is a limit to the thickness of this layer since when illuminated it must have uniform conductivity thereacross.

An increase in the scanning rate accompanied by a decrease in resistivity will increase signal currents, as will an increase in capacitance across the dielectric. The effect of other variations in parameters can be readily gauged from the equations already given.

While the invention has been described by means of specific examples, and in a specific embodiment, there is no wish to be limited thereto, for obvious modifications will occur to those skilled in the art without departing from the spirit and scope of the invention.

I claim:

1. Apparatus for generating a signal as a function of area or area dependent parameters of each particle in a particulate population sample, comprising:

an electron scanning tube having a gun end and a face end with an electron gun assembly positioned therewithin at the gun end thereof, a target also disposed within said tube adjacent the face end thereof and focusing and accelerating grids disposed between the gun assembly and the target, said electron gun assembly arranged to direct an electron beam towards said target, said target including, a transparent conductive layer, a photoconductive layer, and a transparent insulating layer sandwiched between said conductive and said photoconductive layers, said resulting sandwich target oriented within said tube so that said photoconductive layer faces said electron gun assembly;

particulate population sample retaining means disposed outside of said tube before the face end thereof in general alignment with the sandwich target;

a lens positioned between said sample retaining means and said tube so that a focused image of each particle of said particulate population sample is presented on said sandwich target;

conducting means electrically contacting said photoconductive layer to provide for uniform charge of said photoconductive layer;

a control amplifier connected to said electron gun assembly to control the voltage potential of said electron beam with respect to said sandwich target;

scanning means for causing said beam to traverse said photoconductive layer in a controlled manner according to a predetermined pattern to intersect each image of each particle of said particulate population sample focused on said sandwich target; and a control circuit connected to said scanning means, said control amplifier and said conductive layer and responsive to current flow in said conductive layer for disenabling said scanning means to cause said electron beam to pause whenever said electron beam intersects a particle image focused on said target for discharging of the photoconductive area coincident with the focused image of the particle and current flow from said conductive layer, occurring as a function of the discharging of the photoconductive area, exceeds a predetermined value, for the period during which said threshold current value is exceeded, changing the voltage output of said amplifier so that the voltage potential difference between said electron beam and said sandwich target at each intersected image is reduced to a predetermined value, and generating a measuring signal proportional to current flow in said conductive layer as a function of said period during which said beam is caused to pause at each intersected image of each particle of the particulate population sample, said measuring signal being a function of area or area dependent parameters of each particle of the particulate population sample.

2. The apparatus according to claim 1, wherein said control circuit comprises:

a threshold circuit having only first and second output states, connected to said conductive layer by means of a signal amplifier, responsive to current flow therefrom, the output of said threshold circuit being constrained to assume said first output state whenever said current flow does not exceed a predetermined value and said second output state when it does;

first circuit means connected to said scanning means and said control amplifier, responsive to said threshold circuit output for generating a pause signal whenever said output assumes said second output state, the period of said pause signal corresponding to the period of said second output state;

second circuit means connected to said signal amplifier and said first circuit means responsive to current flow from said conductive layer and said pause signal for generating a measuring signal proportional to said current flow and as a function of said period of said pause signal.

3. The apparatus according to claim 2, which additionally comprises:

radiation means disposed before said tube face for illuminating said target for a predetermined period of time prior to scanning operation of said apparatus; and sequencing circuit means connected to said radiation means, said control circuit, said control amplifier and said scanning means for inhibiting operation of said control circuit, said control amplifier and said scanning means while said radiation means illuminates said target.

4. The apparatus according to claim 3, wherein said sequencing circuit comprises:

a starting circuit for generating a switching signal;

switching circuit means connected to said starting circuit for connecting said radiation means and said conducting means to suitable power sources in response to and upon receipt of said switching signal; and timing circuit means connected to said starting circuit, said control circuit, said scanning means and said control amplifier for generating a start signal a predetermined period of time after receipt of said switching signal to inhibit generation of said switching signal by said starting circuit and to cause commencement of operation of said apparatus.

5. Method of generating a signal as a function of area and area dependent parameters of each particle of a particulate sample, comprising the steps of:

providing particles in a particulate population sample;

providing an electron beam source for generating an electron beam;

disposing an electron beam target having a transparent insulating layer sandwiched between a transparent conductive layer on a side toward the sample and a photoconductive layer on a side toward the electron beam source between the sample and the electron beam source;

disposing conducting means to electrically contact said photoconductive layer;

electrically energizing the conducting means to control an initial voltage level of the photoconductive layer;

deenergizing the conducting means;

focusing images of the particles of the particulate population sample upon the target;

directing an electron beam from the electron beam source towards said target;

focusing the electron beam upon the target;

controlling the voltage of the electron beam source with respect to the target;

scanning the beam transversely across the photoconductive layer of the target in a controlled manner according to a predetermined pattern to intersect the images of the particles focused on the target;

disenabling the scanning of the electron beam and pausing the electron beam when the current flow from the conductive layer exceeds a predetermined threshold value upon intersection of the electron beam with an image of a particle focused on the target and discharging of the photoconductive area coincident with the image of each particle, said pausing occurring for the period during which the current exceeds the threshold value;

reducing the voltage potential difference between the electron beam source and the target to a predetermined value during the pausing of the electron beam; and generating a signal as a function of the total current flow from the conductive layer during the period when the scanning of the electron beam is disenabled and the photoconductive area coincident with the image of each particle discharges, said signal being representative of area and area dependent parameters of each particle of the particulate population sample.

* * * * *

UNITED STATES PATENT OFFICE
CERTIFICATE OF CORRECTION

Patent No. 3,865,493                           Dated Feb. 11, 1975

Inventor(s) Roger R. A. Morton

It is certified that error appears in the above-identified patent and that said Letters Patent are hereby corrected as shown below:

Column 1, Line 40 change "acintillations" to --scintillations--;
Column 1, Line 50 change "ansused" to --assumed--;
Column 1, Line 52 change "grossent" to --grossest--;

Column 3, Line 38 after "illustration" insert --of an equivalent circuit used for discharge analysis.--

Column 3, Lines 39 and 40 delete "FIG. 7 an equivalent circuit used for discharge analysis."
Line 40 insert --FIG.-- before "7".

Column 4, Line 60 change "cause" to --causes--.

Column 5, Line 31 change "this" to --the--;
Column 5, Line 59 change "162" to --160--.

Column 6, Line 9 change "OR" to --"OR"-- ;
Column 6, Line 12 change "OR" to --"OR"--;
Column 6, Line 38 insert --therefor-- after "173";
Column 6 Line 44 change "AND" to --"AND"--;
Column 6, Line 55 change "AND" to --"AND"--.

Column 7, Line 51 change "$\int_{i_{r_s}}^{r1}$" to --$\int_{r_2}^{r1}$--.

Column 8, Line 32 change "$C_a = C_o p$" to --$C_b = C_o p$--;

Column 8, Line 38 after "sCb)" insert --1/2--
Column 8, Line 57 after "(u" insert --1/2--.

UNITED STATES PATENT OFFICE
CERTIFICATE OF CORRECTION

Page 2

Patent No. 3,865,493          Dated February 11, 1975

Inventor(s) Roger R. A. Morton

It is certified that error appears in the above-identified patent and that said Letters Patent are hereby corrected as shown below:

Column 9, line 2, change "(r)" to -- (x) --.

Signed and sealed this 1st day of July 1975.

(SEAL)
Attest:

RUTH C. MASON
Attesting Officer

C. MARSHALL DANN
Commissioner of Patents
and Trademarks